United States Patent [19]

Gokhale

[11] Patent Number: 4,885,493
[45] Date of Patent: Dec. 5, 1989

[54] OUTPUT VOLTAGE CONTROL APPARATUS OF A PERMANENT MAGNET ALTERNATOR

[75] Inventor: Kalyan P. Gokhale, Warren, Mich.

[73] Assignee: General Motors Corporation, Detroit, Mich.

[21] Appl. No.: 223,328

[22] Filed: Jul. 25, 1988

[51] Int. Cl.$^4$ ............................................. H02K 21/40
[52] U.S. Cl. ................................. 310/190; 310/68 D; 310/117; 322/51
[58] Field of Search ............... 310/114, 117, 122, 190, 310/191, 68 D; 322/49, 50, 51; 188/77 R, 77 W

[56] References Cited

U.S. PATENT DOCUMENTS

| | | | |
|---|---|---|---|
| 925,504 | 6/1909 | Porsche | 310/191 |
| 1,079,008 | 11/1913 | Inrig | 322/51 |
| 3,470,408 | 9/1969 | Lewis et al. | 310/190 |
| 4,027,229 | 5/1977 | Frink | 310/190 |
| 4,305,031 | 12/1981 | Wharton | 322/50 |
| 4,766,362 | 8/1988 | Sadvary | 322/50 |

FOREIGN PATENT DOCUMENTS 626470 9/1978 U.S.S.R. ............................. 310/191

OTHER PUBLICATIONS

Donovan, "Motion Control with Wrap-Spring Clutches", Machine Design, 24 Sep. '87, pp. 111-114.

Primary Examiner—Peter S. Wong
Assistant Examiner—D. L. Rebsch
Attorney, Agent, or Firm—Mark A. Navarre

[57] ABSTRACT

A permanent magnet alternator including a flux diversion member resiliently and magnetically coupled to the permanent magnet rotor for rotation therewith, an auxiliary (control) permanent magnet rotor rigidly coupled to the flux diversion member for rotation therewith, an auxiliary stator disposed about the auxiliary rotor, and control means for variably loading the auxiliary stator to adjust the rotary position of the flux diversion member relative to the main permanent magnet rotor. The flux diversion member comprises a plurality of magnetic flux conducting vanes which coact with the rotor magnets such that variation of its rotary position relative to the rotary position of the permanent magnet rotor varies the stator flux, and hence the alternator output voltage.

8 Claims, 3 Drawing Sheets

OUTPUT VOLTAGE CONTROL APPARATUS OF A PERMANENT MAGNET ALTERNATOR

The present invention is directed to output voltage control of an alternator having a permanent magnet rotor, and more particularly to an adjustable flux diversion apparatus for carrying out the control.

BACKGROUND OF THE INVENTION

The output voltage of a permanent magnet alternator is proportional to the product of the rotor speed and the stator flux produced by the rotor magnets. When the alternator is driven by a variable speed source, such as the engine of a motor vehicle, the output voltage and power likewise vary. Instead of employing an external voltage regulator, various flux diversion arrangements have been proposed for regulating the alternator output voltage by varying the stator flux. See, for example, U.S. Patent No. 2,610,993 to Stark, issued Sept. 16, 1952, and the European Patent Application No. 058,025, filed Jan. 29, 1982.

SUMMARY OF THE PRESENT INVENTION

The present invention is directed to an improved flux diversion apparatus for voltage control of an N-pole alternator having a permanent magnet rotor, including a flux diversion member resiliently and magnetically coupled to the permanent magnet rotor for rotation therewith, an auxiliary permanent magnet rotor rigidly coupled to the flux diversion member for rotation therewith, an auxiliary stator disposed about the auxiliary rotor and control means for variably loading the auxiliary stator to adjust the rotary position of the flux diversion member relative to the main permanent magnet rotor. The flux diversion member comprises N regions of soft magnetic material which coact with the rotor magnets such that variation of its rotary position relative to the rotary position of the permanent magnet rotor varies the stator flux and hence the alternator output voltage and power.

BRIEF DESCRIPTION OF THE DRAWINGS

FIG. 1 is a cross section along the axis of the rotor; FIGS. 2a and 2b are views of FIG. 1 taken along lines 2—2, for maximum and minimum stator flux conditions, respectively.

DETAILED DESCRIPTION OF THE ILLUSTRATED EMBODIMENT

Figure 1:
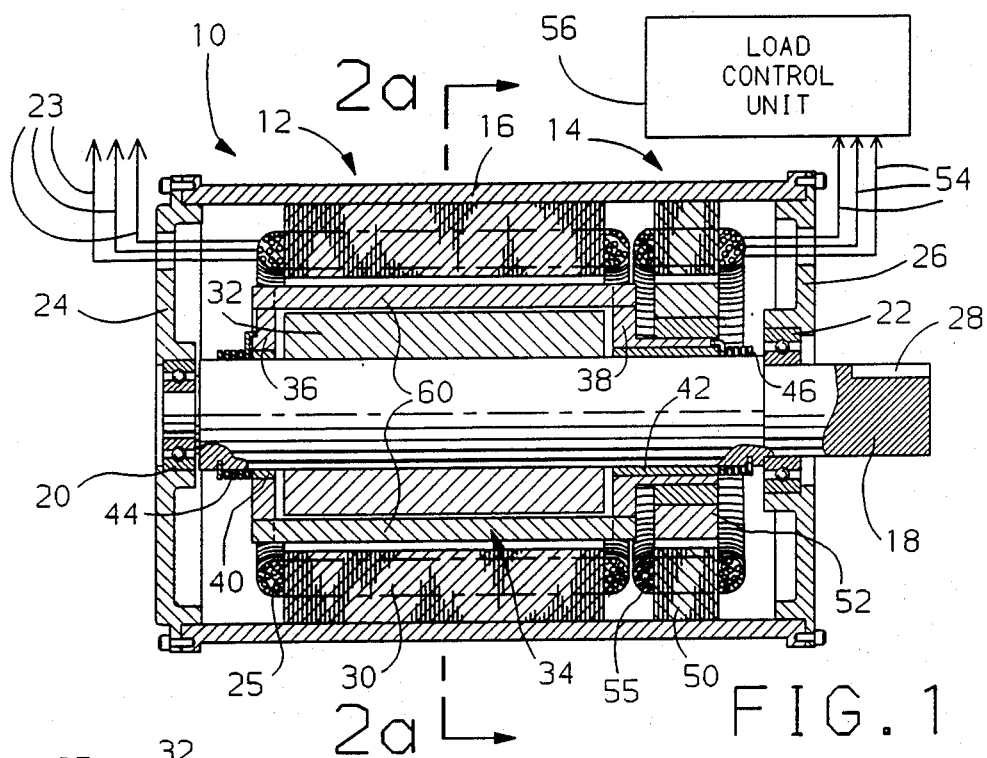
FIGS. 1, 2a and 2b depict a permanent magnet alternator and load control unit according to this invention.

FIG. 1 depicts a permanent magnet alternator 10 comprising a main machine 12 and an auxiliary or control machine 14 disposed within a single housing member 16. The alternator drive shaft 18 is supported on the ball bearing assemblies 20, 22 mounted in the housing end plates 24, 26, the end plates being fastened to the housing member 16, as shown. In a motor vehicle application, a suitable pulley (not shown) is retained on shaft 18 via the key 28 and belt driven by the engine crankshaft.

The main machine 12 comprises a three-phase six-pole laminated stator assembly 30 secured to the inner periphery of housing 16, a six-pole permanent magnet rotor 32 secured to the drive shaft 18, and a flux diversion member 34 disposed in the working air gap between the stator 30 and rotor 32. The end leads 23 of the stator winding 25 are fed through a suitable opening in the end plate 24, as shown. The flux diversion member 34 is supported at each end thereof by a nonmagnetic end ring 36, 38. The end rings 36, 38, in turn, are rotatably supported with respect to shaft 18 on the sleeve bearings 40, 42.

Figure 2A:
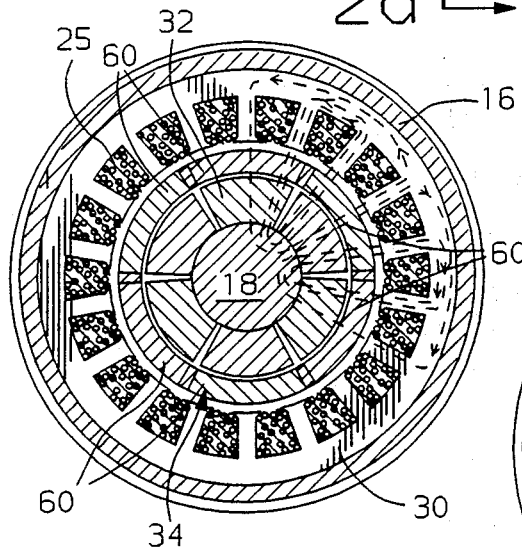

A pair of springs 44, 46 resiliently couple the shaft 18 to the flux diversion member 34 to produce a centering torque which tends to align the flux diversion member 34 with the rotor 32 as illustrated in FIGS. 1 and 2a. Springs 44, 46 are preferably wrap springs; while normal spiral springs may alternately be employed, wrap springs have a nonlinear force characteristic which is used to advantage in the illustrated embodiment of this invention, as explained below.

The auxiliary machine 14 comprises a three-phase two-pole laminated stator assembly 50 secured to the inner periphery of housing 16, and a two-pole permanent magnet rotor 52 secured to an axial extension of the nonmagnetic end ring 38. The end leads 54 of the stator windings 55 are fed through a suitable opening in the housing end plate 26 and connected to a load control unit 56, described below in reference to FIG. 4.

Figure 2B:
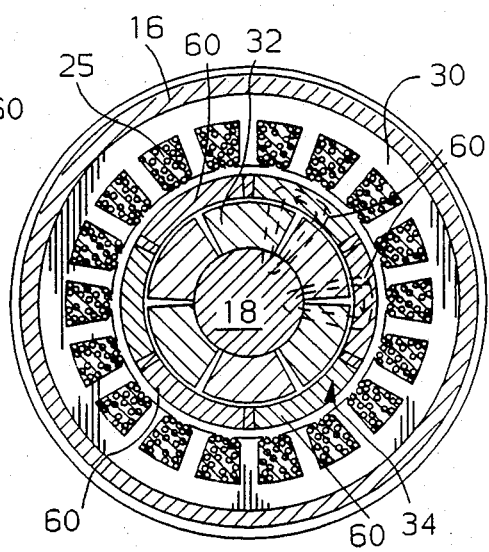

As best seen in FIGS. 1, 2a and 2b, the flux diversion member 34 is defined by a cage of six spaced arcuate vanes 60 formed of soft magnetic material. The circumferential dimension of each vane 60 is substantially the same as that of a permanent magnet of the rotor 32. The vanes 60 may be attached to the support rings 36, 38 by a dovetail or similar locking fit In FIG. 2a, the flux diversion member vanes 60 are exactly aligned with the permanent magnets of rotor 32. Maximum stator flux is achieved in this orientation, as substantially all of the flux produced by the rotor magnets passes through the vanes 60 and into the stator 30. This is a magnetically stable orientation; over a limited range, any angular displacement of the flux diversion member 34 from the stable position results in a magnetic restoring (centering) torque due to the reluctance change between the rotor magnets and the vanes 60.

Figure 3:
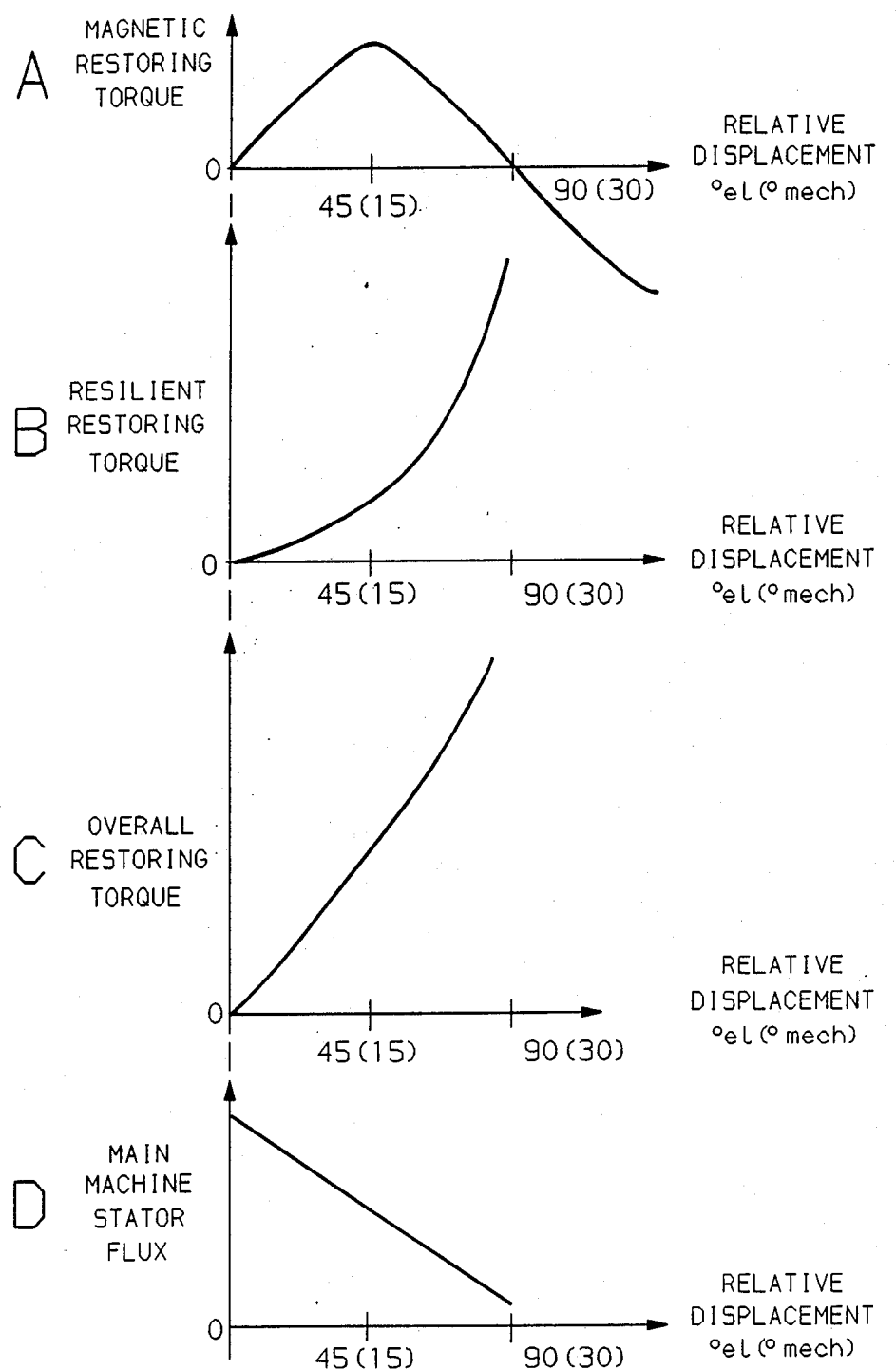
FIG. 3 is a graphical representation of the operation of the permanent magnet alternator of FIG. 1.

The magnitude and direction of the magnetic restoring torque varies with the relative displacement between the magnets of rotor 32 and flux diversion member 34, as graphically depicted in FIG. 3a. As illustrated by the graph, the magnetic restoring force has a positive slope for relative displacements between 0 and 45 electrical degrees (15 mechanical degrees for the illustrated six-pole machine), and a negative slope for relative displacements between 45 and 90 electrical degrees (30 mechanical degrees for the illustrated six-pole machine).

The resilient restoring force developed by the wrap springs 44, 46 augments the magnetic restoring force described above. It also varies with relative displacement of the rotor 32 and flux diversion member 34 but is unidirectional, as graphically depicted in FIG. 3b. The sum of the magnetic and resilient restoring forces, referred to herein as the overall restoring force, for relative displacements of 0–90 electrical degrees is graphically depicted as a function of such displacement in FIG. 3c.

Although the slope of the magnetic restoring force is negative for relative displacements between 45 and 90 electrical degrees, the slope of the overall restoring force remains positive. The positive slope is desirable from a control standpoint because it guarantees direct proportionality between the loading of auxiliary machine 14 and the resulting displacement of the flux diversion member 34 relative to the rotor 32.

The sharp increase in the resilient force of the springs beyond 90 degrees of relative displacement is due to the special characteristics of wrap springs 44, 46. In the rest position depicted in FIG. 1, there are small gaps between individual turns of the springs 44, 46. Such gaps shrink as the springs 44, 46 are loaded by relative displacement of the rotor 32 and flux diversion member 34. At maximum relative dsplacement (approximately 90 degrees) adjacent turns of the springs 44, 46 are in engagement, and the springs 44, 46 define a substantially rigid coupling between the rotor 32 and flux diversion member 34.

Since the rotor 52 of the auxiliary machine 14 rotates with the flux diversion member 34, a voltage is induced in the windings of the stator 50. Loading of the auxiliary machine stator windings produces a load torque on the rotor 52 which is connected to the flux diversion member 34. Such load torque is balanced by the overall restoring torque (defined in FIG. 3c) with relative displacement of the flux diversion member 34 with respect to the rotor 32.

As the windings of stator 50 are loaded, the flux diversion member vanes 60 rotate relative to the magnets of rotor 32 and variably bridge adjacent magnets to shunt magnetic flux therebetween and away from the stator 30. FIG. 3d graphically depicts the variation in stator flux as a function of the relative displacement. FIG. 2b depicts a maximum loading condition in which the flux diversion member 34 is angularly displaced from the rotor 32 by 90 electrical degrees (30 mechanical degrees). Minimum stator flux occurs in this orientation, as substantially all of the flux produced by a respective rotor magnet is shunted to an adjacent rotor magnet 32 via the vanes 60 of flux diversion member 32.

The variation of stator flux with displacement of the flux diversion cage member 34, as depicted in FIG. 3d, produces a corresponding variation in the output voltage of the main machine 12 stator winding 25. Thus, the stator windings 55 of the auxiliary machine 14 are loaded in relation to the desired output voltage. When the windings 55 are open-circuited, the output voltage is at a maximum; as the loading increases from zero, the output voltage decreases.

Figure 4:
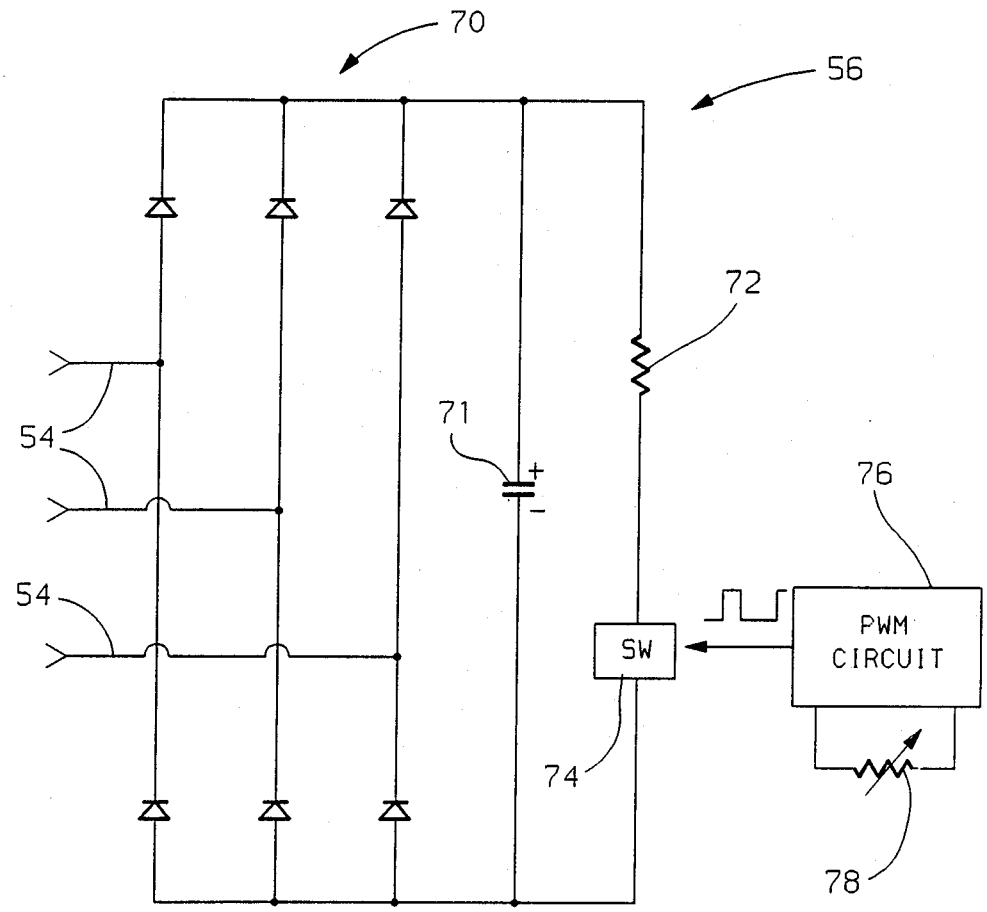
FIG. 4 is a circuit diagram of the load control unit of FIG. 1.

Referring to FIG. 4, the load control unit 56 comprises a full-wave diode bridge rectifier 70 connected to the three-phase output 54 of auxiliary (control) machine 14, a filter capacitor 71, and the serial combination of a load resistor 72 and a solid state switch 74 connected across the DC output of the bridge rectifier 70. The switch 74, which may be a power bi-polar or field-effect transistor, is pulse-width-modulated by a conventional PWM CIRCUIT 76.

The output duty cycle of PWM CIRCUIT 76, and hence the resistive loading of the auxiliary machine output 54, is controlled by adjusting the resistance of PWM CIRCUIT resistor 78. When the duty cycle is 0%, the auxiliary machine stator windings 55 are unloaded, the flux diversion member 34 is in the position shown in FIG. 2a and the output voltage of the main machine stator windings 25 is at its maximum. When the duty cycle is 100%, the effective load on the auxiliary machine stator windings 55 is determined by the resistance of the load resistor 72 so that the torque thereby produced is sufficient to rotate the flux diversion member 34 by 90 electrical degrees (30 mechanical degrees in the illustrated embodiment) with respect to the rotor 32 as in FIG. 2b. In such case, the output voltage of the main machine stator windings 25 is at its minimum.

Alternative arrangements for causing relative angular displacement of the flux diversion member with respect to the rotor 32 such as a fan, for example, may be employed in combination with the auxiliary machine 14. In this regard, it will be understood that although this invention has been described in reference to the illustrated embodiment, various modifications may be made thereto. By way of further example, springs 44, 46 may be omitted if the relative displacement of the flux diversion member 34 and the rotor 32 is mechanically limited to less than 45 electrical degrees; this, of course, correspondingly limits the stator flux variation and is not a preferred mechanization. It should be recognized that systems incorporating these and other modifications may fall within the scope of this invention which is defined by the appended claims.

The embodiments of the invention in which an exclusive property or privilege is claimed are defined as follows:

1. A voltage controlled permanent magnet alternator comprising:
   a rotor shaft rotatably supported in a stationary alternator housing:
   main machine means including a main permanent magnet rotor pole structure secured to the rotor shaft for rotation therewith, a main stator pole structure secured to said housing radially displaced with respect to said main rotor pole structure, and a main output winding wound therein, said main rotor and stator pole structures being magnetically coupled such that an alternating output voltage in induced in said said main output winding during rotation of said rotor shaft;
   flux control means including a plurality of magnetic flux conducting vanes disposed in a radial cavity between said main rotor and stator pole structures;
   control machine means axially displaced from said main machine means including a control permanent magnet rotor pole structure supported for rotation with said flux control means, a control stator pole structure secured to said housing, and a control output winding wound therein such that rotation of the control permanent magnet pole structure with respect to the control stator pole structure induces a voltage in the control output winding; and
   load control means for effecting a variable passive loading of the output winding of said control machine to vary the angular displacement of the flux conducting vanes of said flux control means with respect to said rotor and stator pole structures of said main machine, thereby varying the magnetic coupling therebetween to control the magnitude of the voltage induced in said main output winding.

2. The alternator set forth in claim 1, wherein
   the flux control means includes a pair of end rings rotatably supporting said magnetic flux conducting vanes on said rotor shaft, one of said end rings including an axially extending member secured to the permanent magnet rotor pole structure of said control machine.

3. The alternator set forth in claim 2, including:

resilient means mechanically coupling said end rings to said rotor shaft to define a resilient restoring torque which tends to maintain said flux conducting vanes in a rotary position with respect to said main rotor pole structure which maximizes the flux coupling between said main rotor and stator pole structures.

4. A voltage controlled permanent magnet alternator comprising:

a rotor shaft rotatably supported in a stationary alternator housing;

main machine means including a main permanent magnet rotor pole structure secured to the rotor shaft for rotation therewith, a main stator pole structure secured to said housing radially displaced with respect to said main rotor pole structure, and a main output winding wound therein;

flux control means including a plurality of magnetic flux conducting vanes disposed in a radial cavity between said main rotor and stator pole structures, the main rotor and stator pole structures being magnetically coupled through said vanes to generate an alternating output voltage in said main output winding during rotation of said rotor shaft, the flow of magnetic flux through said flux conducting vanes creating a magnetic restoring torque which tends to maintain said vanes in a rotary position with respect to said main rotor pole structure which maximizes the flux coupling between said main rotor and stator pole structures for generating maximum output voltage in said main stator winding;

control mcahine means axially displaced from said main machine means including a control permanent magnet rotor pole structure supported for rotation with said flux control means, a control stator pole structure secured to said housing, and a control output winding wound therein such that rotation of the control permanent magnet pole structure with respect to the control stator pole structure induces a voltage in the control output winding; and load control means for effecting a variable passive loading of the output winding of said control machine to develop a load torque on said flux conducting means which opposes said magnetic restoring torque thereby to vary the rotary position of said flux conducting vanes with respect to said main rotor pole structure for variably reducing the magnetic flux in the main stator structure, and hence the voltage generated in said main output winding.

5. The permanent magnet alternator set forth in claim 4, wherein:

the flux control means includes resilient means mechanically coupling said flux conducting vanes to said rotor shaft to define a resilient restoring torque which augments the magnetic restoring torque to define an overall restoring torque which tends to maintain said vanes in said rotary position with respect to said main rotor pole structure which maximizes the flux coupling between said main rotor and stator pole structures.

6. The permanent magnet alternator set forth in claim 5, wherein:

the resilient means comprises at least one wrap spring connected between the flux control means and the rotor shaft.

7. The permanent magnet alternator set forth in claim 4, wherein:

the load control means comprises the series combination of a load resistor and a solid state switching device connected across the control output winding, and control means for modulating the conduction of said switching device to modulate the loading of said control output winding.

8. The permanent magnet alternator set forth in claim 7, wherein:

the modulation of said control means is controlled in accordance with the desired output voltage of said main stator winding.

* * * * *